Figure 1:
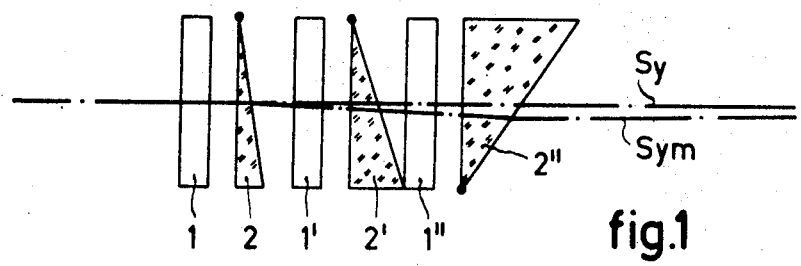

United States Patent

[11] 3,572,895

| [72] | Inventors | Uwe Schmidt<br>Pinneberg;<br>Walter Thust, Hamburg-Niendorf,<br>Germany |
|------|-----------|---|
| [21] | Appl. No. | 780,743 |
| [22] | Filed | Dec. 3, 1968 |
| [45] | Patented | Mar. 30, 1971 |
| [73] | Assignee | U. S. Philips Corporation<br>New York, N.Y. |

[54] OPTICAL DEFLECTION SYSTEM INCLUDING AN ALTERNATING SEQUENCE OF BIREFRINGENT PRISMS AND POLARIZERS
7 Claims, 5 Drawing Figs.

[52] U.S. Cl. .................................................... 350/157,
350/Digest 2, 350/150
[51] Int. Cl. ..................................................... G02f 3/00
[50] Field of Search............................................ 350/147,
160; 350/150, 152, 157, 286, (D.L.D. Digest)

[56] References Cited
UNITED STATES PATENTS

| 2,942,538 | 6/1960 | Bechtold .................. | 350/157UX |
| 3,391,972 | 7/1968 | Harris et al. ............... | 350/157X |
| 3,482,899 | 12/1969 | Schmidt .................... | 350/157X |

*Primary Examiner*—David Schonberg
*Assistant Examiner*—Paul R. Miller
*Attorney*—Frank R. Trifari ABSTRACT: An optical deflection system including a plurality of birefringent prisms separated by polarizers arranged in a sequence. At least one of the prisms has a refracting angle greater than that of any of the other prisms, and is oriented in a direction substantially opposite to that of the refracting angles of the other prisms.

INVENTORS
UWE SCHMIDT
WALTER THUST
BY

AGENT

OPTICAL DEFLECTION SYSTEM INCLUDING AN ALTERNATING SEQUENCE OF BIREFRINGENT PRISMS AND POLARIZERS

The invention relates to an optical deflection system including an alternating sequence of birefringent prisms and polarizers. From British Patent Specification No. 994,955 digital light deflecting systems are known which comprise an alternating sequence of birefringent prisms and polarization switches. In an article by W. J. Tabor in "Applied Optics" No.6, 1967, page 1275, ("Multiple Imaging Device Using Wollaston Prisms") light beam multipliers have been described which for effecting polarization use $\lambda/4$ plates as equivalent birefringent elements. In this article the refracting angles of the prisms by which an incident beam is slightly deflected generally form a geometrical progression with the common ratio 2.

For the construction of a one-dimensional digital beam deflecting device, i.e. a device in which the light beam is deflected in one plane, it is desirable for structural reasons that in the case of a beam incident in a direction parallel to the axis of the system the axis of symmetry of the totality of all possible directions of emergence should correspond to the axis of the system. Furthermore it is desirable for the position of the axis of symmetry relative to the system axis to be independent of the temperature of the system in order to avoid changes in the degree of polarization and consequently noise.

Solutions which have hitherto been suggested for satisfying these requirements use Wollaston prisms or similar constructions which are obtained by a suitable combination of at least two prisms in each digital element stage. The invention means a practical simplification in that for each stage only a single prism is required. According to the invention, the refracting angle or truncated portion of the prism having the greatest refracting angle is oriented in a direction substantially opposite to that of the refracting angles of the other prisms.

Figure 2:
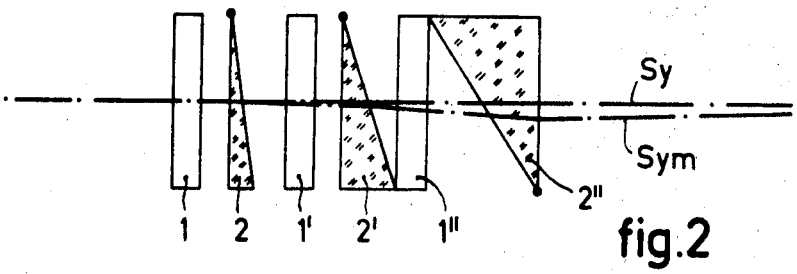
Figure 3:
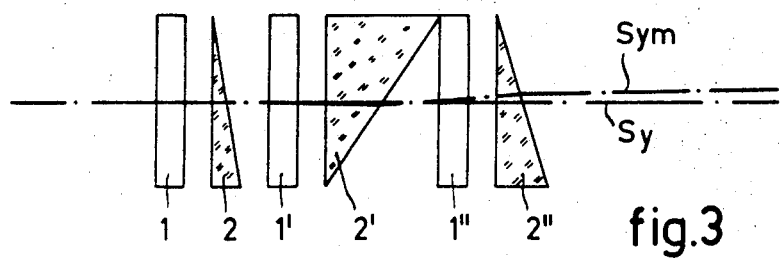
Figure 4:
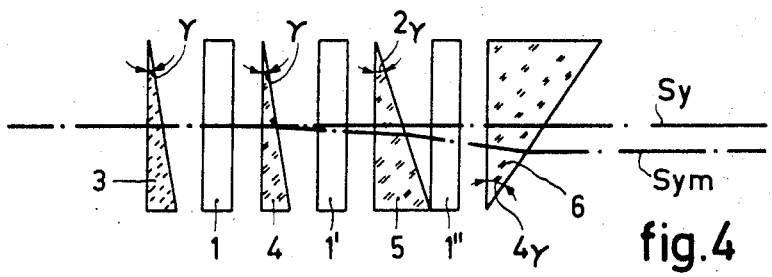
Figure 5:
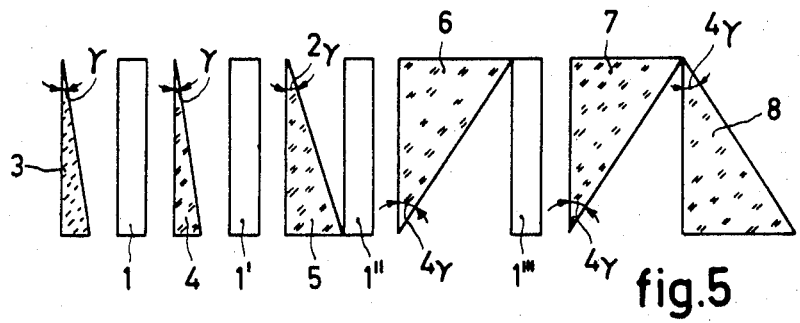

For a better understanding of the invention, reference is made to the accompanying drawing in which FIG. 1 is schematic representation of one embodiment of an optical system according to the invention; FIG. 2 is a schematic representation of another embodiment; FIGS. 3, 4 and 5 are schematic representations of other embodiments of the invention.

The arrangement shown in FIG. 1 is distinguished from that shown in FIG. 2 by a smaller aberration of the angle of incidence. The polarization switches 1, 1' and 1" in FIGS. 1 and 2 may be Kerr cells or $\lambda/4$ plates. In the latter case, the light beam is correspondingly split, whereas Kerr cells enable a light beam to be controllably deflected in a known manner. In both FIGS. each of the birefringent prisms 2, 2' and 2" has a refracting angle which is twice that of the preceding prisms. The prism 2" has its refracting angle oriented oppositely to those of the preceding prisms. In both FIGS. the light is produced by a light source, not shown, positioned at the left.

The temperature stability obtained in the arrangements by the use of the inventive thought will now be illustrated with reference to a numerical example. The maximum deviation of the axis of symmetry S$ym$ of the field of all possible beam directions from the system axis S$y$ is given by the angle which the system axis S$y$ makes with the bisector of the two beam directions defined by the prism having the smallest refracting angle. This angle is 3 inches in a calcite prism having a refracting angle of 4 feet which is surrounded by nitrobenzene and deflects a lightbeam produced by a He-Ne laser. The said angle increases to 3.7 inches when the temperature rises from 15° C. to 25° C. The values given for the angular deviations are independent of the number of the prisms included in the system, neglecting manufacturing tolerances and angle aberrations in the case of very large refracting angles.

In the simple prism system used hitherto the angular deviations increase with increase in the number of prisms. For example, in a 10-stage light deflector the corresponding values of the angular deviations would be larger by a factor of $2^{10}=1,024$.

If the logic of the binary control signals used in the arrangement of FIGS. 1 and 2 is to be equal to that in the known arrangement, a corresponding orientation of the optic axis of the "inverted" prism in FIGS. 1 and 2 must be ensured. If, for example, all the prisms have the same orientation of their optic axes, the optic axis of the "inverted" prism 2" in FIGS. 1 and 2 must be rotated through 90° relative to the optic axis of the prisms 2 and 2'.

A further embodiment is shown in FIG. 3. In this arrangement the prism 2' having the greatest refracting angle is arranged at the penultimate position. The angle correction is the same as in the arrangement shown in FIGS. 1 and 2, but the arrangement of FIG. 3 has the additional property of minimum beam displacement.

In the above-described arrangement the residual very small angular deviation may still be appreciably reduced by inserting an isotropic prism 3, for example a single prism, in the path of the beam as is shown in FIG. 4. In this case, in order to obtain optimum reduction of the angular deviation and of the temperature dependence of this angular deviation the refracting angle $\Phi$ of the isotropic prism 3 must be equal to that of the birefringent prism 4 having the smallest refracting angle. The refractive index $n_i$ of the isotropic prism 3 then is given by the equation $$n_i = \frac{n_0 + n_e}{2}$$

where $n_o$ = the refractive index of the birefringent prism 4 for the ordinary ray and $n_e$ = the refractive index of the birefringent index of the birefringent prism 4 for the extraordinary ray.

The temperature coefficients of the refractive indices of these two prisms must be equal as possible. The positioning of the prisms 5 and 6 corresponds to that of the prisms 2' and 2" in the arrangements shown in FIGS. 1 and 2.

The above considerations apply only to those cases in which in the calculation of the refracting angles the trigonometric ratios may be replaced in the law of refraction by the angles while remaining within the scope of the desired accuracy. Generally this assumption can be made. Since otherwise aberrations of the angle of incidence will occur, normally technically more complicated and hence more expensive combinations of single prisms will be used for correcting these aberrations, the two problems referred to in the preamble of the application being automatically solved. Therefore, in such cases preferably only the first stages of the deflection system will be built from single prisms. FIG. 5 shows diagrammatically the embodiment in which the last position is occupied by a compound prism 7, 8.

The above-described embodiments relate to one-dimensional digital optical systems, but they may analogously be extended to systems using deflections in two directions.

We claim:

1. An optical deflection system for deflecting a light beam along a given axis comprising a plurality of birefringent prisms separated by polarizers, one of said prisms having a refracting angle greater than that of any of the other prisms, the truncated refracting portion of said prism pointing in a direction opposite to the direction in which the truncated refracting portion of the other prism point.

2. An optical system as claimed in claim 1, wherein all the prisms each have a given optical axis with the same orientation.

3. A optical system as claimed in claim 1, wherein in the prism having the greatest refracting angle, said prism has an optic axis which is rotated through 90° with respect to the optic axis of each of the other prisms and wherein the optic axis of all of the said other prisms are oriented in the same direction.

4. An optical system as claimed in claim 1, wherein the prism having the greatest refracting angle is the final prism in a given sequence.

5. An optical system as claimed in claim 1, wherein the prism having the greatest refracting angle is the penultimate prism in a given sequence.

6. An optical system as claimed in claim 1, wherein the system includes a single isotropic prism the refracting angle of which is equal to that of a prism having the smallest refracting angle and the refractive index of which is such that the axis of the system corresponds to the axis of symmetry of the beam.

7. An optical system as claimed in claim 1, wherein the birefringent prisms consist of calcite and are surrounded by nitrobenzene.